UNITED STATES PATENT OFFICE.

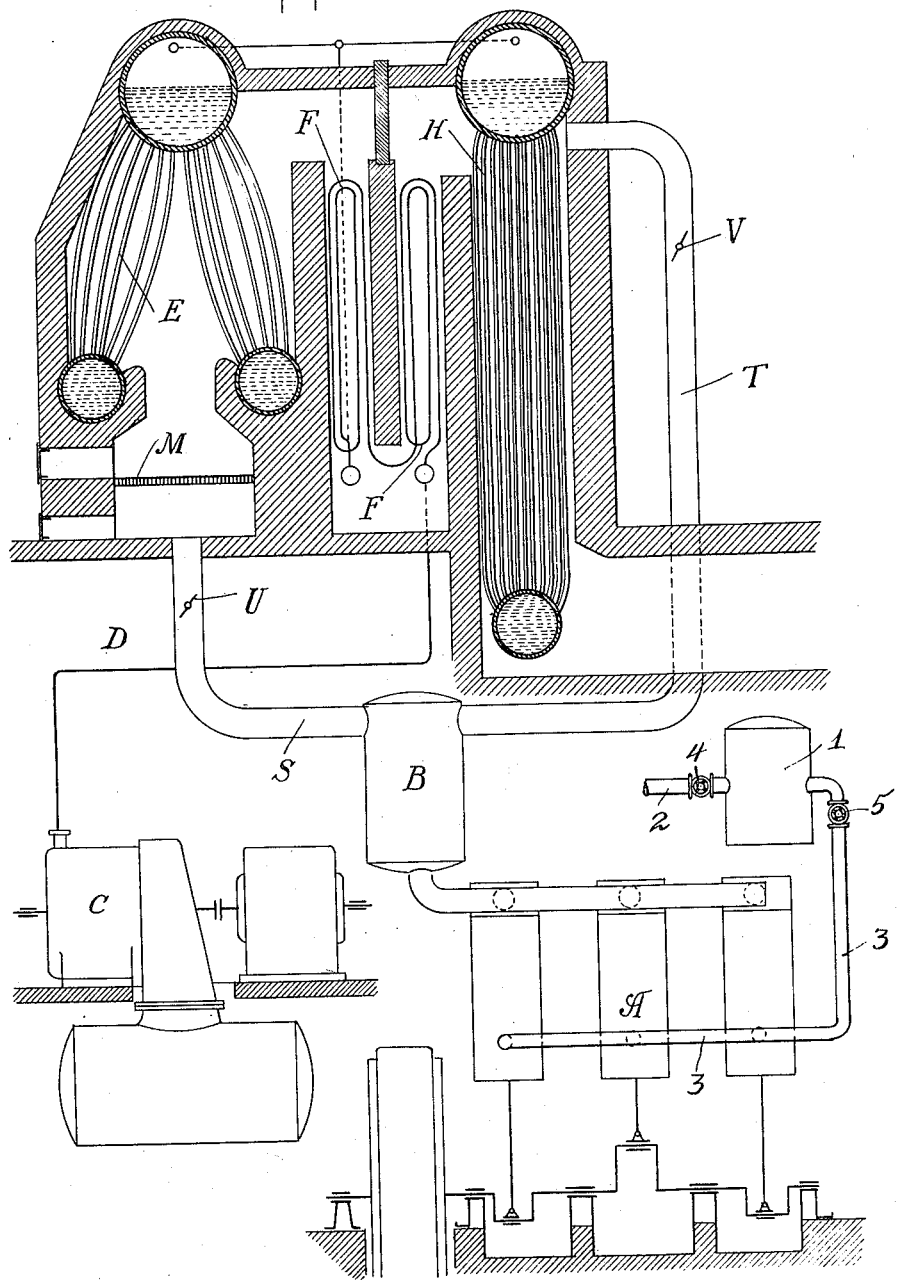

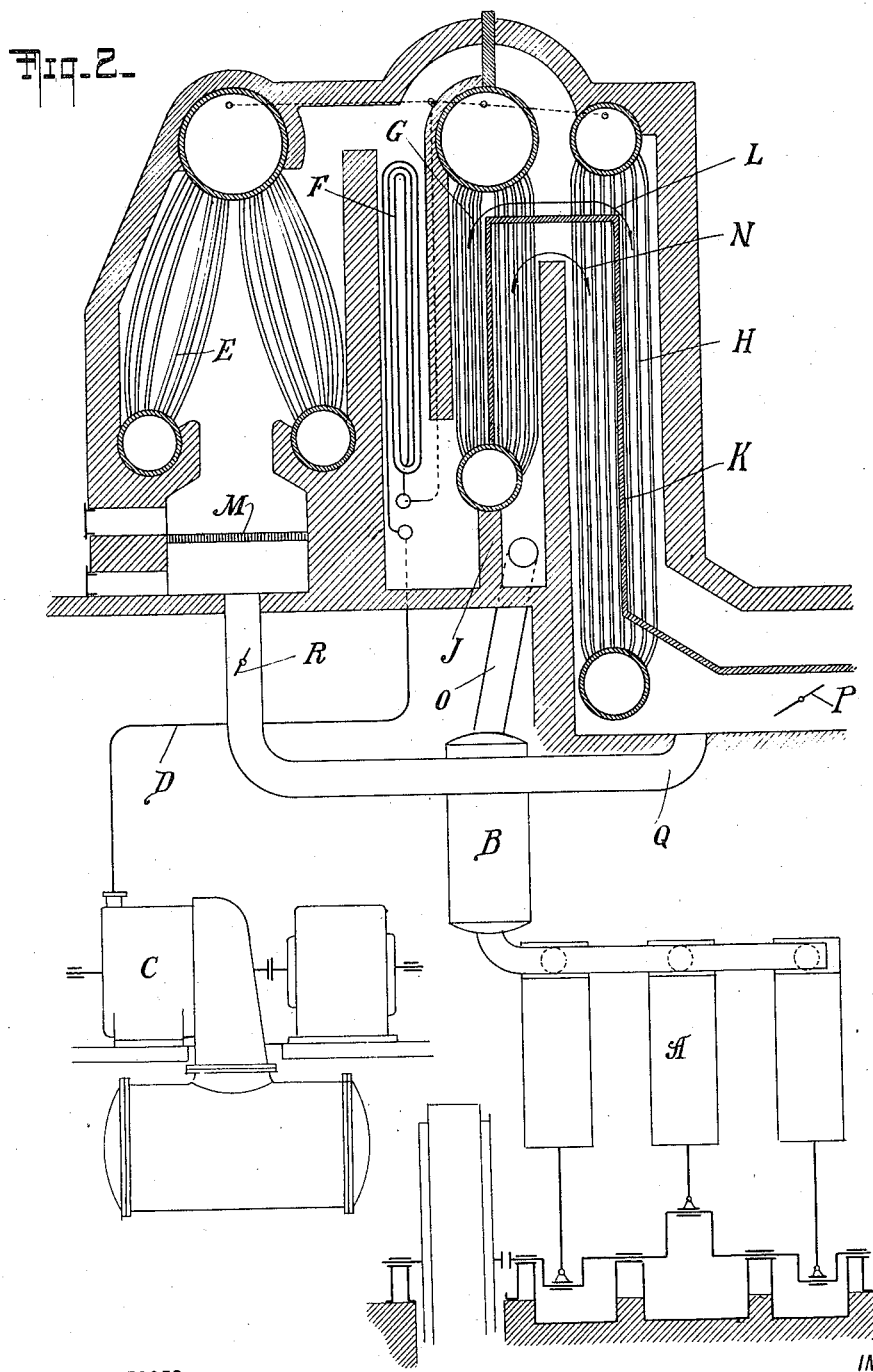

WILHELM SCHMIDT, OF WILHELMSHÖHE, NEAR CASSEL, GERMANY, ASSIGNOR, BY MESNE ASSIGNMENTS, TO SUPERHEATER COMPANY, A CORPORATION OF DELAWARE.

POWER ENGINE PLANT.

1,398,946.    Specification of Letters Patent.    Patented Nov. 29, 1921.

Application filed January 26, 1915, Serial No. 4,458. Renewed November 20, 1919. Serial No. 339,400½.

(GRANTED UNDER THE PROVISIONS OF THE ACT OF MARCH 3, 1921, 41 STAT. L., 1313)

*To all whom it may concern:*

Be it known that I, WILHELM SCHMIDT, doctor of engineering, a subject of the German Emperor, and resident of Wilhelmshöhe, near Cassel, in the German Empire, have invented an Improved and Novel Power Engine Plant, of which the following is a specification.

This invention relates in general to a power engine plant composed of a combustion engine and a steam power plant, in which the waste heat of said combustion engine is made use of for the generation of steam in said steam power plant. In particular, the invention relates to a special construction of the said combustion engine, the object being to bring about a particularly good utilization of the waste heat of this engine in the said steam plant, as is all fully described hereinafter.

Briefly described, my invention comprises the combination of a combustion engine, operated with a charge of pre-compressed air mixed with only so much fuel as would be added if air at atmospheric pressure were used; and a boiler or steam generator adapted to be heated by the exhaust of said engine. In a practical embodiment of my invention there may, of course, be added as a part of the boiler system, a suitable superheater, feed water heater, and other like auxiliaries. The exhaust gases may be utilized to heat some part of the boiler system direct or they may be made a part of an independent firing system for said boiler.

By supplying the cylinder of the combustion engine with a charge of pre-compressed air mixed with no more than the amount of the fuel that would be required to make a suitable combustion mixture in an engine supplied with air at atmospheric pressure, the following advantages are obtained:

First: The quantity of exhaust gas is increased by an amount corresponding to the excess of air.

Second: The number of heat units, contained in the greater quantity of exhaust gas, is increased by reason of the increased heat of compression.

Third: The exhaust gas will contain a very considerable amount of free oxygen (the exact amount depending upon the precompression pressure), and is therefore particularly adapted to be supplied, instead of fresh cold air, to the fire box hearth.

Fourth: The increase of temperature caused by combustion as well as the maximum temperature of combustion is reduced; this makes for increased durability and safety of parts.

Fifth: Owing to the reduced combustion temperature, less heat need be removed from the cylinder for the purpose of cooling the cylinder walls.

Sixth: The lower temperature of the exhaust gases makes it possible to cool the outlet ports of the engine, especially the bridges between ports, with hot water, so as to still further decrease the amount of heat absorbed from said gases; in some cases, and with sufficient excess of air, it may be practically possible to cover the parts in the vicinity of the exhaust ports with a heat insulating material.

Seventh: The power plant, according to the present invention, is of particular advantage inasmuch as the steam part of the plant will constitute a valuable source of reserve power which may be used as a substitute and aid for the less reliable combustion engine.

Eighth: When the invention takes the form which has an independent furnace for the boiler, the steam part of the plant may be advantageously employed for starting the combustion engine.

Where a separate furnace for the steam boiler is used, it must, of course, be sufficiently large to permit of full utilization of the exhaust gases from the combustion engine. Furthermore, the arrangement must be such as to obtain a sufficiently large quantity of heat from the exhaust gases relatively to the heat obtained from the separate furnace.

In the accompanying drawing I have shown two embodiments of my invention.

Figure 1 is a diagrammatical representation of a power plant constructed according to my invention, and Fig. 2 is a similar representation showing a slightly modified form of construction.

A, Fig. 1, is the combustion engine; B a receiver for the exhaust gases of the same;

C a steam turbine; and D a live steam pipe leading from the boiler to said turbine. The boiler consists of the steam generator proper E, the superheater F, and the feed water heater H. The receiver B is connected by a pipe S with the space below the grate M, and by a pipe T with the upper part of the flue containing the feed water heater, H. The pipes S and T are provided with dampers U and V respectively by means of which the distribution of the exhaust gases from the receiver B to the grate M and the feed water heater H respectively may be varied or regulated according to any requirement.

A receiver 1 is supplied with compressed air by a pipe 2 from any usual suitable source and delivered by a pipe 3 to the several cylinders of engine A. Valves 4 and 5 are placed in each pipe 2 and 3.

The part of the exhaust gases passing through the pipe S forms a supply of oxygen for the fuel upon the grate M. The hot products of combustion leaving the burning fuel come in contact first with the steam generator proper E and then with the superheater F, after which they mix with the other part of the exhaust gases escaping from the pipe T. This mixture then acts upon the feed water heater and the waste gases leave finally the respective flue and pass over into the chimney. The damper U is closed before the grate M is charged in order to prevent the flame from extruding forth from the fire door of the furnace.

In the form of construction shown in Fig. 2, the steam generator proper consists of two parts, E and G, the second part being situated between the superheater F and the feed water-heater H. The flues containing the steam generator part G and the feed water heater H are divided by partition walls J and K turning each flue into two channels of which one is intended for the fire gases from the furnace, the other for the exhaust gases from the combustion engine, as indicated by the arrows L and N respectively. The inner channel (arrow N) serves for the exhaust gases, the outer one (arrow L) for the fire gases. The exhaust gases coming from the combustion engine A, or from the receiver B respectively, pass first through said inner channel coming there in contact with a part of the evaporator G and afterward with a part of the feed water heater H; then they are led by a pipe Q to and into the space below the grate whence their further way, or the way of the mixture of said gases with the furnace gases, respectively, is the same as that described with respect to Fig. 1, the only difference being that there is one flue more, viz., that of the evaporator G, and that said mixture passes not through the whole sectional area of the two flues behind the superheater, but only through a part of that sectional area as determined by the position of the partition wall K. P and R are dampers for regulating the flow of the gases in question, as will be clear without a detailed description.

Having described my invention I claim:

1. In a power plant, the combination with a combustion engine; a boiler and a furnace for the same; a pipe connecting the space below the grate of said furnace with another space, and another pipe so arranged as to be adapted to conduct the exhaust gases of said engine to said last named space; of means for feeding the said engine with compressed air, substantially as and for the purpose described.

2. In a power plant, the combination with a combustion engine; a boiler and a furnace for the same; and means for conducting the exhaust gases of said engine into a boiler space behind the grate, as well as into the space below the grate; of means for feeding the said engine with compressed air, substantially as and for the purpose described.

3. In a power plant, the combination with a combustion engine; a boiler and a furnace for the same; a conduit connecting the space below the grate of said boiler with another boiler space situated in the rear part of the boiler, and another conduit connecting a boiler space located between said two spaces with said engine; of means for feeding the said engine with compressed air, substantially as and for the purpose described.

4. In a power plant, the combination with a combustion engine; a boiler and a furnace for the same; a pipe connecting the space below the grate of said boiler with a rear flue of the same; and another pipe connecting a middle flue of the boiler with the exhaust ports of said engine; of means for feeding the said engine with compressed air, substantially as and for the purpose described.

5. In a power plant, the combination with a combustion engine; a boiler and a furnace for the same; a flue forming part of said boiler; an evaporator arranged in said flue; a partition wall dividing the said flue into two parallel conduits and completely closing one of them at its end nearest the boiler, a pipe connecting the closed end with the exhaust pipe of said engine, and another pipe connecting the other end of said conduit with the furnace of the said boiler; of means for feeding the said engine with compressed air, substantially as and for the purpose described.

6. In a power plant, the combination with a combustion engine; a boiler and a furnace for the same; two consecutive flues forming parts of said boiler; an evaporator arranged in the first of said flues; a feed water heater in the second of them; a partition wall extending through the said two flues and dividing each of them into two parallel conduits; a pipe connecting one of the conduits of said first flue, at the commencement of the same, with the exhaust pipe of said engine; and another pipe connecting the corresponding conduit of said second flue, at the end of the same, with the furnace of the said boiler, of means for feeding the said engine with compressed air, substantially as and for the purpose described.

In testimony whereof I have hereunto set my hand in the presence of two subscribing witnesses.

WILHELM SCHMIDT.

Witnesses:
 JULIUS FRANKE,
 GUSTAV TARBE.